US007681340B2

(12) United States Patent
Treuthardt

(10) Patent No.: US 7,681,340 B2
(45) Date of Patent: Mar. 23, 2010

(54) ELECTRONIC CONTROL DEVICE

(75) Inventor: Paul Treuthardt, Monroe, WI (US)

(73) Assignee: Monroe Truck Equipment, Inc., Monroe, WI (US)

( * ) Notice: Subject to any disclaimer, the term of this patent is extended or adjusted under 35 U.S.C. 154(b) by 160 days.

(21) Appl. No.: 11/803,331

(22) Filed: May 14, 2007

(65) Prior Publication Data

US 2008/0083141 A1 Apr. 10, 2008

Related U.S. Application Data

(60) Provisional application No. 60/800,693, filed on May 15, 2006.

(51) Int. Cl.
*E02F 5/02* (2006.01)
*G05D 1/02* (2006.01)
*H01H 19/00* (2006.01)

(52) U.S. Cl. .......................... 37/348; 37/234; 200/6 A; 345/161

(58) Field of Classification Search .................. 37/348, 37/382, 231–236; 172/2, 4, 5, 9, 781; 345/161; 200/6 A; 74/523; 701/50
See application file for complete search history.

(56) References Cited

U.S. PATENT DOCUMENTS

| | | | | | |
|---|---|---|---|---|---|
| 4,739,128 | A | * | 4/1988 | Grisham | 200/6 A |
| 5,412,299 | A | * | 5/1995 | Gregory et al. | 318/628 |
| 5,512,892 | A | * | 4/1996 | Corballis et al. | 341/22 |
| 5,524,368 | A | * | 6/1996 | Struck et al. | 37/235 |
| 5,551,701 | A | * | 9/1996 | Bouton et al. | 463/36 |
| 5,566,586 | A | * | 10/1996 | Lauer et al. | 74/523 |
| 5,576,704 | A | * | 11/1996 | Baker et al. | 341/20 |
| 5,796,056 | A | * | 8/1998 | Bredow et al. | 200/5 A |
| H1822 | H | * | 12/1999 | Kelley et al. | 180/333 |
| H1831 | H | * | 2/2000 | Kelley et al. | 180/333 |
| 6,068,554 | A | * | 5/2000 | Tyler | 463/38 |
| 6,152,239 | A | * | 11/2000 | Kelley et al. | 172/4.5 |
| 6,226,582 | B1 | * | 5/2001 | Adsett et al. | 701/50 |
| 6,354,023 | B1 | * | 3/2002 | Trahan et al. | 37/219 |
| 6,429,849 | B1 | * | 8/2002 | An et al. | 345/161 |
| 6,489,946 | B1 | * | 12/2002 | Takeda et al. | 345/161 |
| 6,518,952 | B1 | * | 2/2003 | Leiper | 345/156 |
| 6,550,562 | B2 | * | 4/2003 | Brandt et al. | 180/333 |
| 6,590,171 | B1 | * | 7/2003 | Wolf et al. | 200/51 LM |
| 6,670,562 | B2 | * | 12/2003 | Kaneko | 200/1 B |
| 6,691,435 | B1 | * | 2/2004 | Schultz et al. | 37/234 |
| 6,707,447 | B1 | * | 3/2004 | Goranowski | 345/167 |
| 6,766,236 | B1 | * | 7/2004 | Lamela et al. | 701/50 |
| 6,899,539 | B1 | * | 5/2005 | Stallman et al. | 434/11 |
| 7,034,552 | B2 | * | 4/2006 | Kirchner et al. | 324/686 |

(Continued)

FOREIGN PATENT DOCUMENTS

DE 19630711 A1 * 8/1997

*Primary Examiner*—Thomas A Beach
(74) *Attorney, Agent, or Firm*—David J. Archer

(57) ABSTRACT

An electronic control device is disclosed for controlling a plow. The control device includes a pendant control structured and arranged such that an operator of the plow is permitted to control the plow by operation of the pendant control. A plurality of switches is mounted on the pendant control for selective operation by the operator. At least one of the switches of the plurality of switches being a multi stage switch which permits the operator to activate to different current driven settings.

12 Claims, 3 Drawing Sheets

U.S. PATENT DOCUMENTS

2002/0166267 A1* 11/2002 McGugan .................... 37/348
2003/0034238 A1* 2/2003 Leung ........................ 200/6 A
2008/0230364 A1* 9/2008 Treuthardt .................. 200/6 A

* cited by examiner

ELECTRONIC CONTROL DEVICE

CROSS REFERENCE TO RELATED APPLICATION

The present application is a Complete application pursuant to Provisional application U.S. Ser. No. 60/800,693 filed May 15, 2006. All the disclosure of U.S. Ser. No. 60/800,693 is incorporated herein by reference.

BACKGROUND OF THE INVENTION

1. Field of the Invention

The present invention relates to an electronic control device. More specifically, the present invention relates to an electronic control device for controlling a plow.

2. Background Information

The present invention relates to an electronic control for use in controlling a plow used in the snow and ice control industry.

The proportional multi stage switch according to the present invention allows the user to activate to different Pulse Width Modulated (PWM) or Current driven settings. The user activates the first setting by pressing the switch to the first setting. Then the user activates the second setting by pressing through the first setting to the second. Additional proportional settings can be achieved by adding additional activation points to the mechanical design. The proportional settings are programmed into the controller through the use of a user interface that is either part of the control system in the vehicle, a calibration tool or from a device that runs a Windows based operating system. Windows is a registered trademark of Microsoft Inc. Settings are adjustable from 0-100% of PWM or current control settings.

Therefore, the primary feature of the present invention is the provision of an electronic control device for controlling a plow that overcomes the problems associated with the prior art controls and which makes a significant contribution to the snow and ice control industry.

Another feature of the present invention is the provision of an electronic control device for controlling a plow that is easier and less costly to manufacture when compared with prior art rod holder devices.

Other features and advantages of the present invention will be readily apparent to those skilled in the art by a consideration of the detailed description of a preferred embodiment of the present invention contained herein.

SUMMARY OF THE INVENTION

The present invention relates to an electronic control device for controlling a plow. The control device includes a pendant control structured and arranged such that an operator of the plow is permitted to control the plow by operation of the pendant control. A plurality of switches is mounted on the pendant control for selective operation by the operator. At least one of the switches of the plurality of switches is a multi stage switch which permits the operator to activate to different current driven settings.

In a more specific embodiment of the present invention, the pendant control includes a handle having a first and a second end. The pendant control also includes a switch box which is secured to the second end of the handle. The switch box has a front and a rear face. A display surface is secured to the front face of the switch box.

Moreover, the plurality of switches are mounted on the display surface so that in use of the device, the operator is permitted to selectively actuate the switches for controlling the plow.

Also, the at least one of the switches is selectively operable to activate a first setting of the multi-stage switch, the multi-stage switch being subsequently operable to activate a second setting thereof.

More specifically, the at least one of the switches is selectively operable to activate a series of settings of the multi-stage switch, the multi-stage switch being operable to activate subsequent settings of the series of settings.

More particularly, each of the settings of the series of settings are proportional to each other.

Such proportional settings are programmed into the device through the use of an interface.

In one arrangement, the electronic control device is connected to a vehicle on which the plow is mounted. A vehicle control system is secured to the vehicle for controlling the vehicle and the interface is integrated with the vehicle control system. However, in another arrangement, the interface is a calibration tool.

Furthermore, the interface is a device such as a computer that runs a computer operating system.

Additionally, the settings are adjustable within a range 0% to 100% of the current driven settings.

Moreover, the settings are Pulse Width Modulated (PWM) Alternatively, the settings are current control settings.

Many modifications and variations of the present invention will be readily apparent to those skilled in the art by a consideration of the detailed description contained hereinafter taken in conjunction with the annexed drawings which show a preferred embodiment of the present invention. However, such modifications and variations fall within the spirit and scope of the present invention as defined by the appended claims.

BRIEF DESCRIPTION OF THE DRAWINGS

Similar reference characters refer to similar parts throughout the various views of the drawings.

DETAILED DESCRIPTION OF THE DRAWINGS

Figure 1:
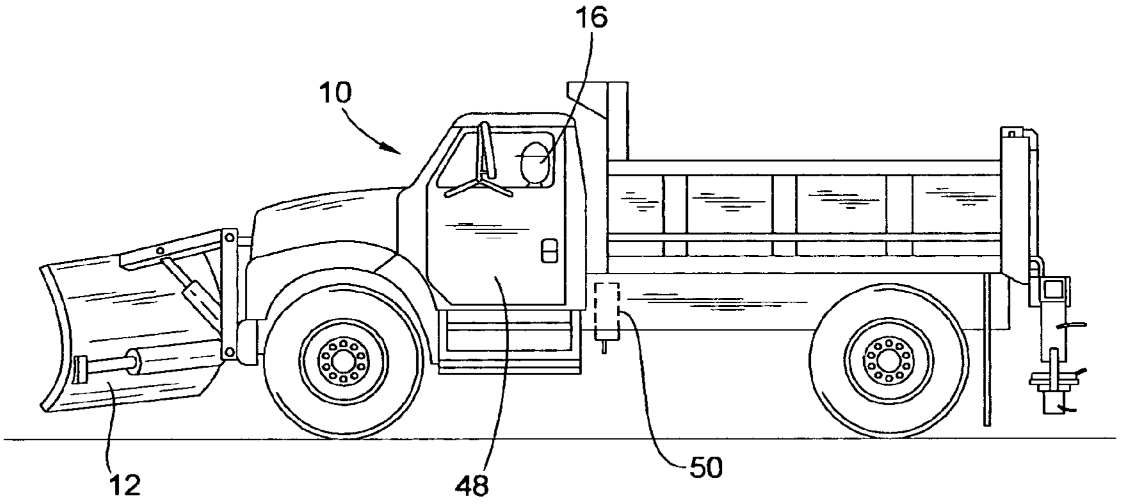
FIG. 1 is a side elevational view of an electronic control according to the present invention for a plow.

FIG. 1 is a side elevational view of an electronic control device generally designated 10 according to the present invention for a plow 12.

Figure 2:
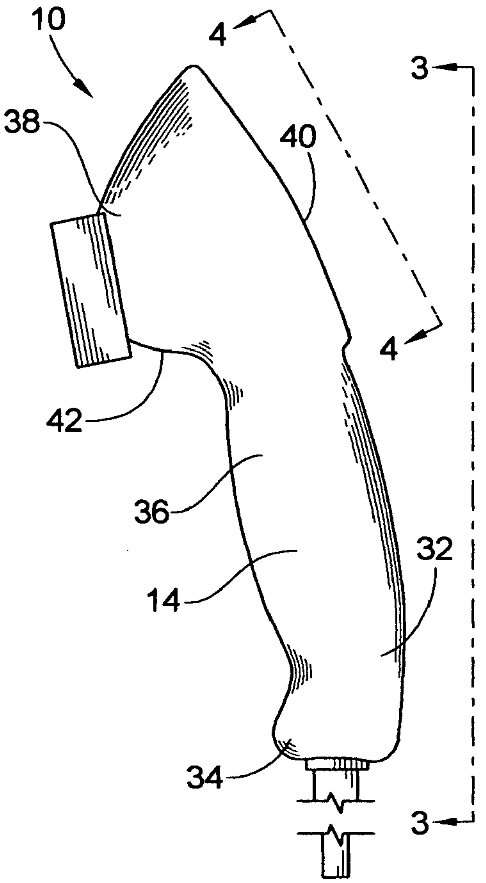
FIG. 2, is an enlarged side elecvational view of the electronic control device shown in FIG. 1.

FIG. 2, is an enlarged side elecvational view of the electronic control device 10 shown in FIG. 1. As shown in FIG. 2, the electronic control device 10 includes a pendant control 14 structured and arranged such that an operator 16 of the plow 12, as shown in FIG. 1, is permitted to control the plow 12 by operation of the pendant control 14.

Figure 3:
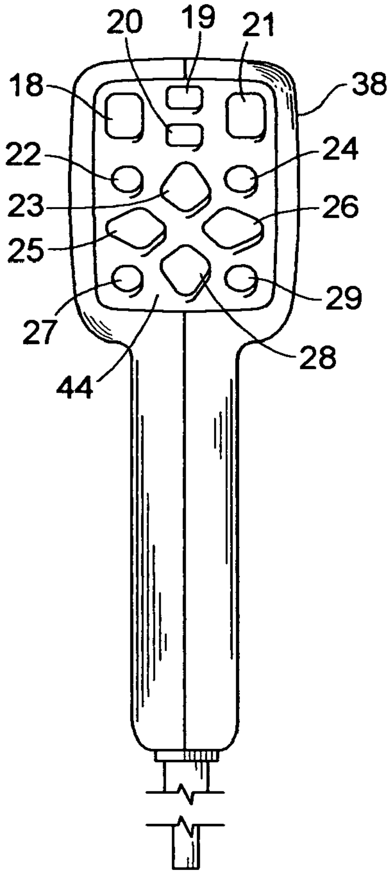
FIG. 3 is a view taken on the line 3-3 of FIG. 2.

FIG. 3 is a view taken on the line 3-3 of FIG. 2. As shown in FIG. 3, a plurality of switches 18, 19, 20, 21, 22, 23, 24, 25, 26, 27, 28 and 29 is mounted on the pendant control 14 for selective operation by the operator 16. At least one of the switches such as switch 22 of the plurality of switches 18-29 is a multi stage switch which permits the operator 16 to activate to different current driven settings.

As shown in FIG. 2, the pendant control 14 includes a handle 32 having a first and a second end 34 and 36 respectively. The pendant control 14 also includes a switch box 38 which is secured to the second end 36 of the handle 32. As shown in FIG. 2, the switch box 38 has a front and a rear face 40 and 42 respectively. As shown in FIG. 3, a display surface 44 is secured to the front face 40 of the switch box 38.

Moreover, the plurality of switches 18-29 is mounted on the display surface 44 so that in use of the device 10, the operator 16 is permitted to selectively actuate the switches 18-29 for controlling the plow 12.

Figure 4:
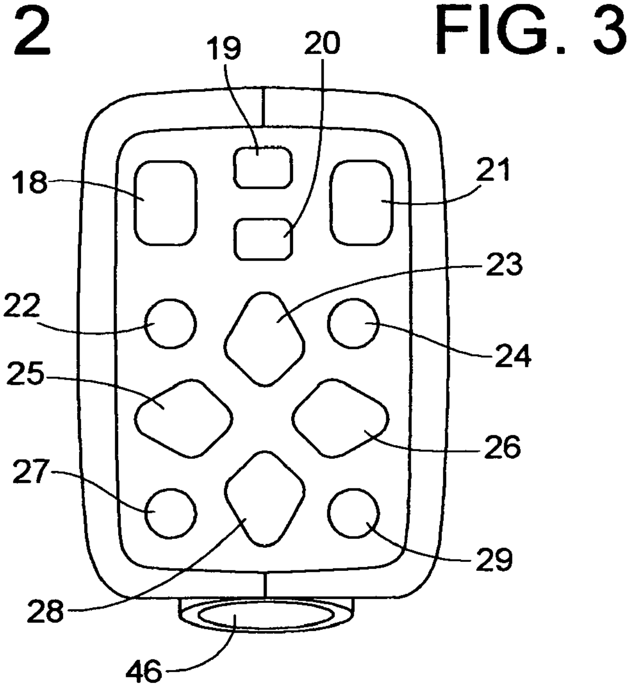
FIG. 4 is an enlarged view taken on the line 4-4 of FIG. 2.

FIG. 4 is an enlarged view taken on the line 4-4 of FIG. 2. As shown in FIG. 4, the at least one of the switches 22 is selectively operable to activate a first setting of the multi-stage switch 22, the multi-stage switch 22 being subsequently operable to activate a second setting thereof.

More specifically, the at least one of the switches 22 is selectively operable to activate a series of settings of the multi-stage switch 22, the multi-stage switch 22 being operable to activate subsequent settings of the series of settings.

More particularly, each of the settings of the series of settings are proportional to each other.

Such proportional settings are programmed into the device 10 through the use of an interface generally designated 46.

In one arrangement, the electronic control device 10 is connected to a vehicle 48 shown in FIG. 1 on which the plow 12 is mounted. A vehicle control system generally designated 50 is secured to the vehicle 48 for controlling the vehicle 48 and the interface 46 shown in FIG. 4 is integrated with the vehicle control system 50.

Figure 5:
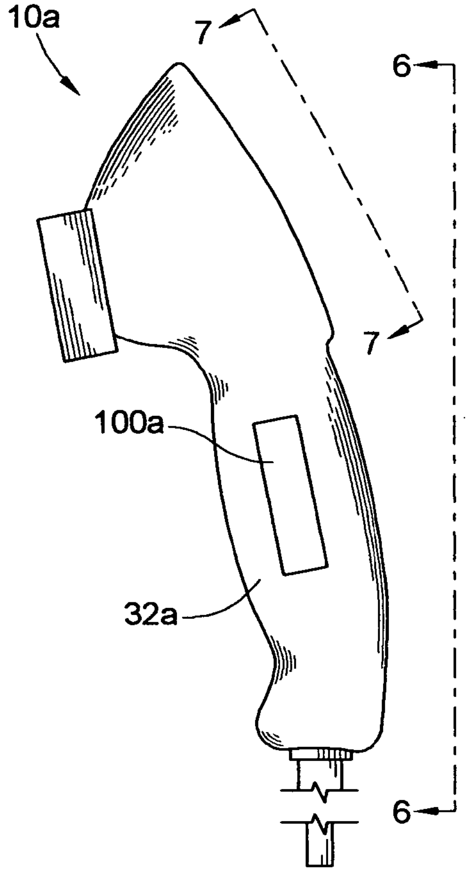
FIG. 5 is a similar view to that shown in FIG. 2 but shows another embodiment of the present invention.

FIG. 5 is a similar view to that shown in FIG. 2 but shows another embodiment of the present invention. As shown in FIG. 5, the device 10*a* has a handle 32*a*.

Figure 6:
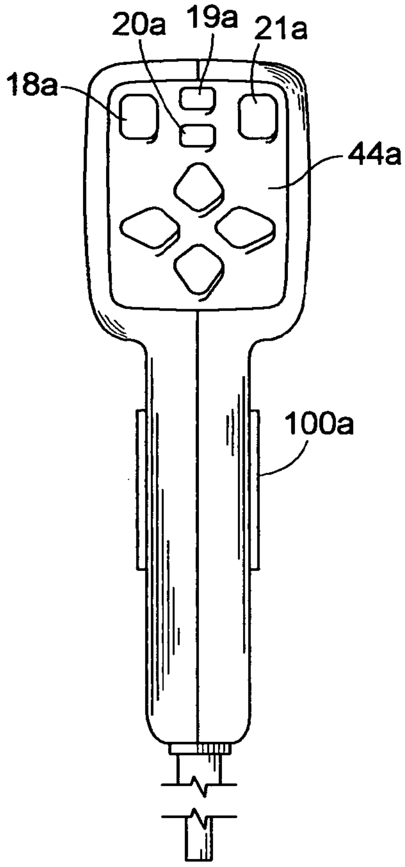
FIG. 6 is a view taken on the line 6-6 of FIG. 5.

FIG. 6 is a view taken on the line 6-6 of FIG. 5. As shown in FIG. 6, a plurality of switches 18*a*, 19*a* 20*a*, 21*a*, 60, 61, 62 and 63 are disposed on the display surface 44*a*.

Figure 7:
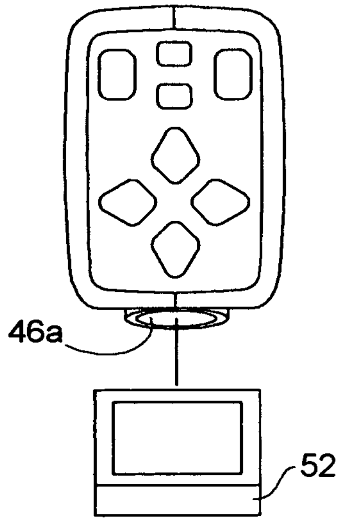
FIG. 7 is an enlarged view taken on the line 7-7 of FIG. 5.

FIG. 7 is an enlarged view taken on the line 7-7 of FIG. 5. As shown in FIG. 7, an interface 46*a* is connected to a calibration tool 52.

More specifically, the interface 46*a* is connected to a device 52 such as a computer that runs a computer operating system.

Additionally, the settings are adjustable within a range 0% to 100% of the current driven settings.

Moreover, the settings are Pulse Width Modulated (PWM).

Alternatively, the settings are current control settings.

As shown in FIGS. 5 and 6, the present invention also includes a capacitance sensor 100*a* which is located in the handle 32*a*. The arrangement is such that when the operator 16 grips the handle 32*a*, the pendant control 14 is activated. In this manner, when the operator's hand is not present, the pendant control 14 will not activate any Pulse Width Modulated or current driven outputs, thereby providing a safety interlock system.

In operation of the device according to the present invention, the operator 16 is able to control various operations of the plow by means of multiple depression of the various switches such as the multi-stage switch 22.

The present invention provides a unique pendant control for controlling a plow in the snow and ice control industry.

What is claimed is:

1. An electronic control device for controlling a plow, said control device comprising:

a plow used in the snow and ice control industry;

a pendant control structured and arranged such that an operator of said plow is permitted to control the plow by operation of said pendant control;

said pendant control including:

a handle having a first and a second end;

a switch box secured to said second end of said handle, said switch box having a front and a rear face;

a display surface secured to said front face of said switch box;

a plurality of switches mounted on said pendant control for selective operation by the operator;

at least one of said switches of said plurality of switches being a multi stage switch which permits the operator to activate to different current driven settings; and a capacitance sensor disposed within said handle, the arrangement being such that when the operator grips said handle, said pendant control is activated so that when the operator's hand is not present, said pendant control will not activate any current driven outputs, thereby providing a safety interlock system.

2. An electronic control device as set forth in claim 1 wherein said plurality of switches are mounted on said display surface so that in use of said device, the operator is permitted to selectively actuate said switches for controlling the plow.

3. An electronic control device as set forth in claim 1 wherein said at least one of said switches is selectively operable to activate a first setting of said multi-stage switch, said multi-stage switch being subsequently operable to activate a second setting thereof.

4. An electronic control device as set forth in claim 1 wherein said at least one of said switches is selectively operable to activate a series of settings of said multi-stage switch, said multi-stage switch being operable to activate subsequent settings of said series of settings.

5. An electronic control device as set forth in claim 4 wherein each of said settings of said series of settings are proportional to each other.

6. An electronic control device as set forth in claim 5 wherein said proportional settings are programmed into said device through the use of an interface.

7. An electronic control device as set forth in claim 6 further including:

a vehicle on which the plow is mounted;

a vehicle control system secured to said vehicle for controlling said vehicle;

said interface being integrated with said vehicle control system.

8. An electronic control device as set forth in claim 6 wherein said interface is connected to a calibration tool.

9. An electronic control device as set forth in claim 6 wherein said interface is a device that runs a computer operating system.

10. An electronic control device as set forth in claim 1 wherein said settings are adjustable within a range 0% to 100% of said current driven settings.

11. An electronic control device as set forth in claim 1 wherein, said settings are Pulse Width Modulated (PWM).

12. An electronic control device as set forth in claim 1 wherein said settings are current control settings.

* * * * *